US005264037A

United States Patent [19]

Salisbury

[11] Patent Number: 5,264,037

[45] Date of Patent: Nov. 23, 1993

[54] POWDER COATING SYSTEM

[75] Inventor: Richard Salisbury, Laguna Niguel, Calif.

[73] Assignee: Blodgett & Blodgett, P.C., Worcester, Mass.

[21] Appl. No.: 839,498

[22] Filed: Feb. 20, 1992

Related U.S. Application Data

[60] Continuation-in-part of PCT/US91/01406, Feb. 28, 1991 which is a continuation of Ser. No. 486,513, Feb. 28, 1990, Pat. No. 5,000,985

[51] Int. Cl.[5] ........................ B05B 5/00; B05B 13/02; B65G 47/26; B65G 15/00

[52] U.S. Cl. .................................... 118/642; 118/110; 118/104; 118/324; 118/314; 118/309; 198/804; 198/419.1; 198/445; 198/340; 198/350; 198/688.1; 198/751

[58] Field of Search ............... 118/324, 104, 109, 110, 118/112, 314, 641, 642, 300, 308, 309, 313, 203; 198/804, 418.7, 419.1, 445, 443, 340, 345.1, 350, 688.1, 751, 583, 363

[56] References Cited

U.S. PATENT DOCUMENTS

| | | | |
|---|---|---|---|
| 1,266,669 | 5/1918 | Eberhart | 118/324 |
| 1,831,064 | 11/1931 | Frederick | 118/309 |
| 2,041,765 | 4/1932 | Howell | 118/314 |
| 2,547,884 | 4/1951 | Paasche | 118/314 |
| 2,573,835 | 11/1951 | Dyar | 118/308 |
| 2,935,173 | 7/1958 | Cozzoli | 198/445 |
| 3,166,434 | 1/1965 | Gauger, Jr. | 118/642 |
| 3,359,944 | 12/1967 | Quackenbush et al. | 118/309 |
| 3,592,676 | 7/1971 | From, Jr. et al. | 118/309 |
| 3,921,574 | 11/1975 | English | 118/104 |
| 4,129,207 | 12/1978 | Cupp | 198/445 |
| 4,577,586 | 3/1986 | Morris et al. | 118/110 |
| 4,860,882 | 8/1989 | Maeda et al. | 198/445 |
| 4,938,412 | 7/1990 | Genter | 118/324 |

FOREIGN PATENT DOCUMENTS 1441525 7/1976 United Kingdom .

*Primary Examiner*—W. Gary Jones
*Assistant Examiner*—Steven P. Griffin
*Attorney, Agent, or Firm*—Blodgett & Blodgett

[57] ABSTRACT

An apparatus for and method of coating an article by the use of electro-static attraction of ionized particles which are subsequently cured. The apparatus includes a first foraminous conveyor for carrying the article through a powder coating zone and a second conveyor for carrying the article through a curing zone. The surface of the article which rests on the foraminous conveyor is cleaned of particles as the article is transferred from the first foraminous conveyor to the second conveyor. The first foraminous conveyor is also cleaned of particles after the article has been transferred. After the articles have been cured to form a coating on the article, the article is put through the coating system again except that the article is supported on the conveyor so that the surface which was not coated in the first pass through the system is out of contact with the conveyor. During the subsequent pass of the article through the coating zone, the uncoated surface of the article is then covered with powder which is subsequently cured during the second pass of the article through the curing zone. The second coating step for the article may be accomplished by passing the article through the same apparatus as for the first step or by passing the article through a second identical apparatus.

23 Claims, 6 Drawing Sheets

FIG. 6
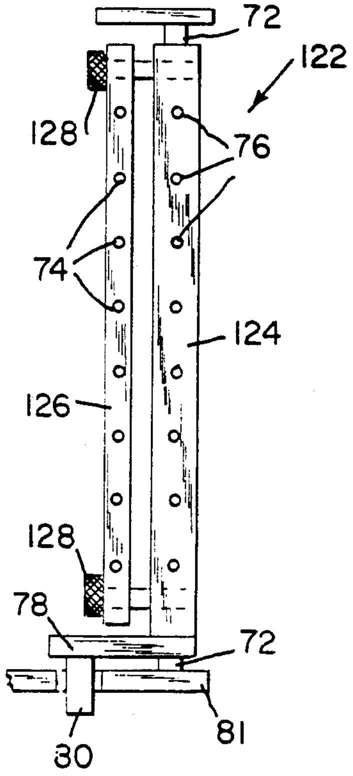
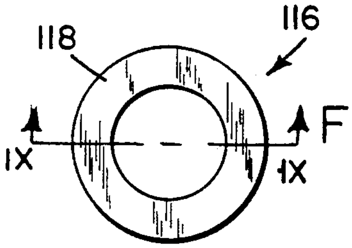
FIG. 7
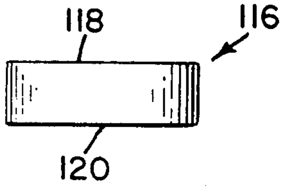
FIG. 8
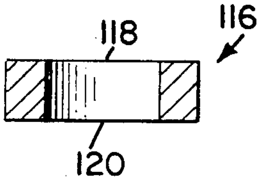
FIG. 9
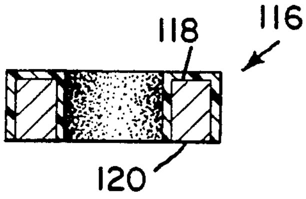
FIG. 10
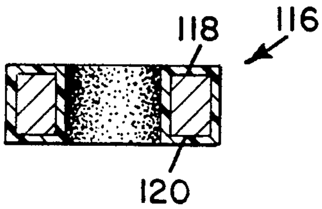
FIG. 11

POWDER COATING SYSTEM

CROSS REFERENCE TO RELATED APPLICATION

The application is a Continuation-In-Part from International Application No. PCT/US91/01406 which designated the United States, filed 28 Feb. 1991 which is a Continuation of U.S. application Ser. No. 486,513, now U.S. Pat. No. 5,000,985.

BACKGROUND OF THE INVENTION

The present invention relates generally to a method of and apparatus for coating articles and, specifically, for coating metallic articles with plastic resin by a process which is known in the industry as powder coating. The articles to be coated are conveyed on a foraminous metallic conveyor through a spray booth. As the articles pass through the spray booth, they are coated with ionized particles of an uncured plastic resin. The resin particles are projected in the form of a spray for an electrode unit which charges and ionizes the particles. The articles to be coated are grounded through the metallic conveyor. The particles are attracted to the grounded article and deposited to all exposed surfaces of the article. The articles are then conveyed to a curing oven which cures or fixes the particles to the articles to form a permanent coating on the articles.

Since the metallic conveyor is also grounded, particles are attached to the conveyor so that the particles also become fixed to the conveyor when the articles are conveyed to the curing oven. Eventually, the conveyor becomes completely coated with plastic. This coating clogs the openings in the conveyor and insulates the conveyor from the articles so that the articles are not grounded and, therefore, do not attract the ionized resin particles. As the ground connection between the articles and the conveyor diminishes, the equality of the coating also diminishes to an unacceptable level.

In order from maintain an acceptable quality of coating on the articles, the conveyor must be replaced by a clean conveyor. This results in downtime and costly lost production. The coated conveyor must be cleaned by burning the coating. However, this creates two additional problems. The burning of the plastic coating requires consumption of energy and creates toxic fumes which must be contained. The equipment for performing both of these tasks and the energy which is required to perform both tasks add considerably to the cost of the coating operation.

Another problem with the existing coating systems is that all the particles which are deposited on the conveyor represent waste.

A still further problem with existing coating systems is that the surface of the article which is in contact with the conveyor is not completely covered with particles when it passes through the spray booth. Also, after the resin coating has been cured, the articles stick to the conveyor and have to be forcefully removed from the conveyor. This can damage the coating on the article and the surface which was in contact with the article has a rough and incomplete coating. The article can be run through this system again so that a different surface of the article rests on the conveyor so that the surface which was incompletely coated can be covered completely. However, the rough and complete coating on that surface prevents the surface from obtaining a uniform finish coating. These and other difficulties experienced with the prior art coating systems have been obviated by the present invention.

It is, therefore, a principle object of the invention to provide a system for coating articles by electro-static attraction of resin particles in which the particles are removed from the surface of the article which rests on the conveyor prior to curing of the resin so that a subsequent passing of the article through the coating system enables the uniform coating to be applied to the surface which was not coated in the first pass of the article through the system.

A further object of the present invention is the provision of a second conveyor which transports the articles through the curing oven after the articles have been coated with resin particles or powder and means for automatically transferring the powder coated articles from the first foraminous conveyor to the second conveyor.

Another object of the present invention is to provide means for removing the uncured resin powder from the foraminous conveyor after the conveyor passes through the spray booth.

A still further object of the invention is the provision of means for collecting the uncured resin powder which is removed from the foraminous conveyor and the articles for subsequently use.

With these and other objects in view, as will be apparent to those skilled in the art, the invention resides in the combination of parts set forth in the specification and covered by the claims appended hereto.

SUMMARY OF THE INVENTION

In general, the invention consists of a system for applying a coating of uncured loose particulate material or powder to an article for subsequent fixing of the particulate material to the article to form a permanent coating about the exposed surfaces of the article. The apparatus comprises a first foraminous conveyor for conveying the articles through a spray zone or a spray booth, a second conveyor for conveying the articles which have been powder coated through a curing zone, and means for transferring the articles from the first conveyor to the second conveyor. More specifically, the surface of the article which rests on the foraminous conveyor is cleaned of uncured powder prior to being transferred to the second conveyor and the first foraminous conveyor is cleaned of uncured powder after the article has been transferred to the second conveyor. The powder which is removed from the article and the first conveyor is recycled.

BRIEF DESCRIPTION OF THE DRAWINGS

The character of the invention, however, may be best understood by reference to one of its structural forms, as illustrated by the accompanying drawings, in which:

FIGS. *1a* and *1b* are side elevational views which may be joined together along the common line A—A and which show a powder coating apparatus embodying the principles of the present invention, FIGS. *2a* and *2b* are top plan views which may be joined together along the common line B—B of the powder coating apparatus, FIG. 6 is a fragmentary plan view showing a modification of the article transferring mechanism, FIG. 7 is a plan view of one type of article which is suited for being coated by the apparatus of the present invention, FIG. 8 is a side elevational view of the article, FIG. 9 is a vertical cross-sectional view of the article taken along the line IX—IX of FIG. 7, FIG. 10 is a cross-sectional view of the article after it has been partially coated by a first pass of the article through the coating apparatus, FIG. 11 is a vertical cross-sectional view of the article after it has been completely coated after a second pass of the article through the coating apparatus.

DETAILED DESCRIPTION OF THE INVENTION

Figure 1A:
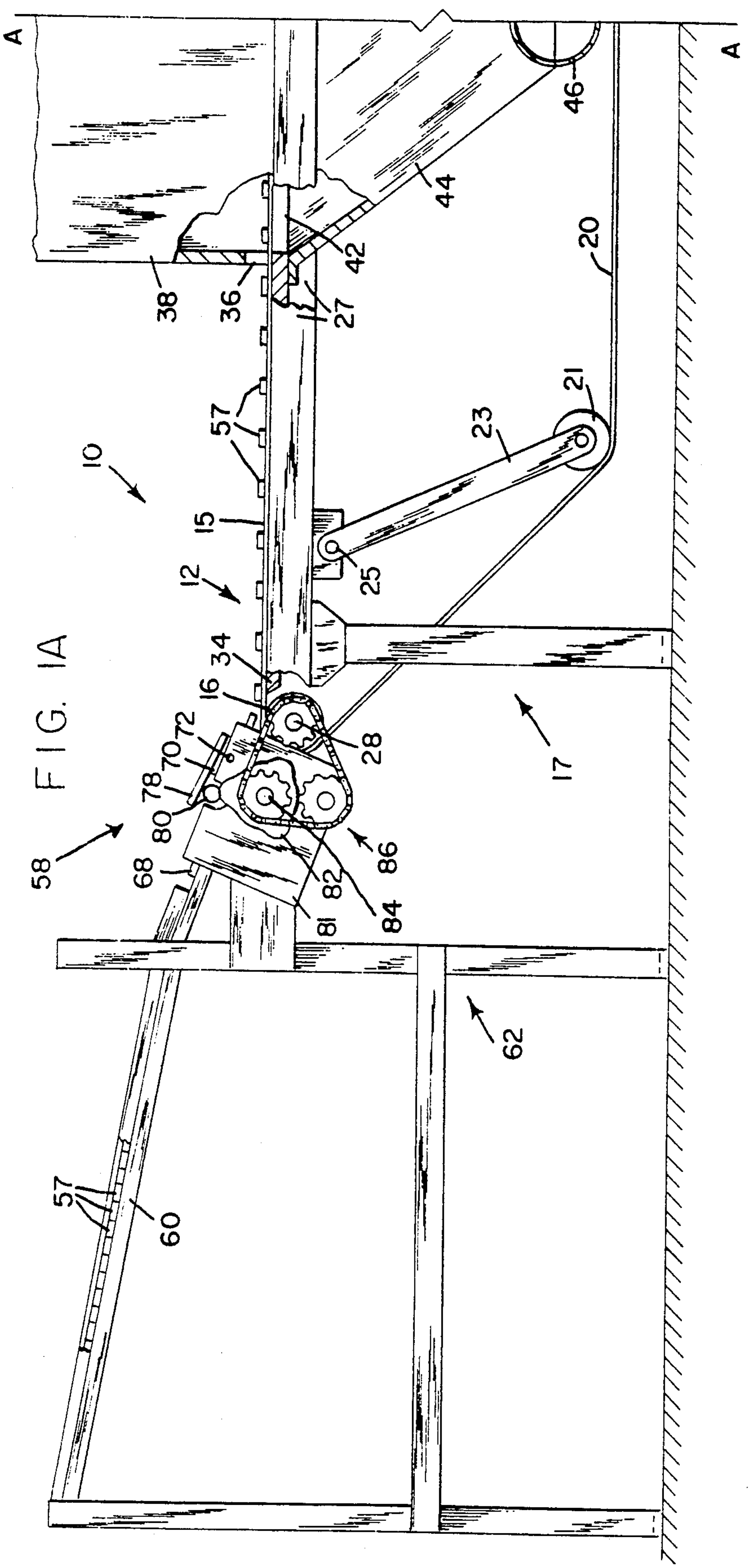

Referring first to FIGS. 1*a*, 1*b*, 2*a* and 2*b*, the coating apparatus of the present invention is generally indicated by the reference numeral 10 and comprises an endless foraminous conveyor belt which is generally indicated by the reference numeral 12 and a second conveyor belt which is generally indicated by the reference numeral 13. The conveyor belt 12 is made of metal which can be grounded and is supported within framework which is generally indicated by the reference numeral 17. The outer surface of the conveyor belt 13 is preferably coated with a poly (tetrafluoroethylene) material which is sold, for example, under the trademark (TEFLON) and is supported within framework which is generally indicated by the reference numeral 14.

The conveyor 12 includes an upper horizontal section 15 which extends between a pair of drive rolls 16 and 18 and a return portion which extends from the drive roll 18 around a pair of rearward and forward idler rolls 21 and 22, respectively, and back to the drive roll 16. The section 15 has an upper surface 19. The rearward idler roll 21 is rotatably mounted to the end of an arm 23 which is pivotally mounted by a pivot pin 25 to the framework 17. The forward idler roll 22 is rotatably mounted to the end of an arm 24 which is pivotally mounted by a pivot pin 26 to the framework 17. Each of the rolls 21 and 22 is weighted and rests on the returning portion 20 of the conveyor 12 for maintaining tension on the conveyor 12. The drive roll 16 is mounted on a shaft 28 which is journaled between a pair of side plates 27 which forms part of the framework 17. The drive roll 18 is mounted on a shaft 30 which is journaled between the plates 27. The horizontal portion 15 of the conveyor 12 is supported on a flat horizontal support plate 34 which is fixed to the side plates 27. The horizontal portion 15 of the conveyor 12 extends through rear and forward openings 36 and 40 of a spray housing or spray booth 38. The spray housing 38 is conventional and contains spray nozzles, not shown, for directing a spray of ionized resin powder or particles toward the conveyor 12. The horizontal support plate 34 has an opening 42 at the lower end of the spray housing 38. Powder which is not deposited on the conveyor or on articles which are carried by the conveyor pass through the foraminous conveyor 12 through the opening 42 and into a funnel 44 which leads to a duct 46. The duct 46 is connected to a source of sub-atmospheric air pressure and powder collecting means, not shown. The conveyor 13 is an endless conveyor which is trained around a rear drive roll 50 and a forward drive roll (not shown) which is driven by conventional drive means (not shown). The conveyor 13 comprises an upper run 48 which rides on top of a flat plate 49 which is supported by the framework 14. The conveyor 13 also comprises a lower return run 51. The roll 50 is mounted on a shaft 52 which is journaled between a pair of vertical posts 53 which form part of the framework 14. The shaft 30 for the roll 18 is rotatably driven from the shaft 52 for the roll 50 by a chain and sprocket drive mechanism which is generally indicated by the reference numeral 54. The upper runs of the conveyors 12 and 13 are driven at the same linear velocity in the direction of arrows 55, from left to right as viewed in FIGS. 1*a*, 1*b*, 2*a*, and 2*b*. The upper run 48 of the conveyor 13 extends through a conventional curing oven 56 which comprises infrared heating lamps (not shown) for curing resin powder and cooling means, not shown, for subsequently cooling articles which have been coated.

Figure 3:
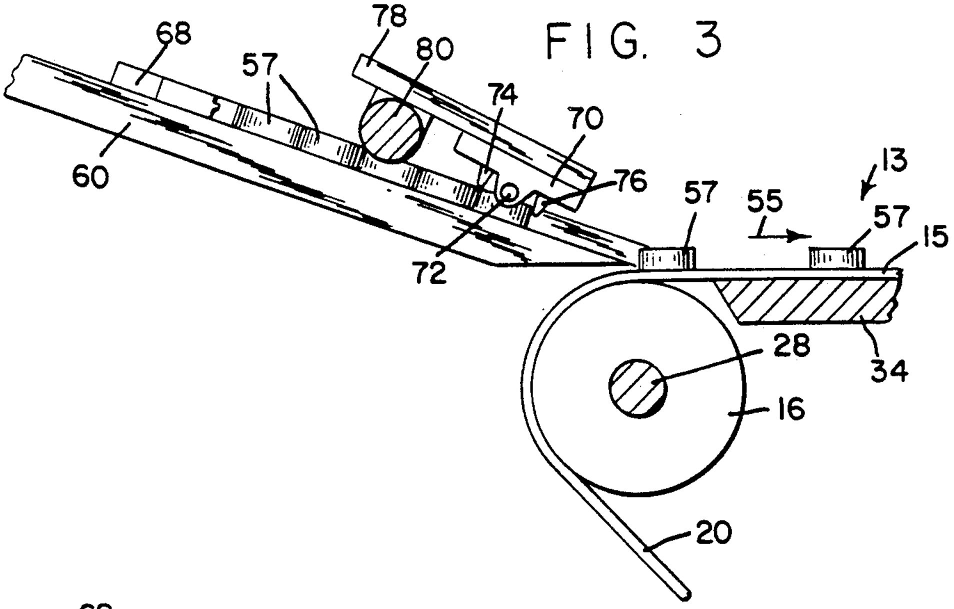
FIG. 3 is a vertical cross-sectional view on an enlarged scale taken along the line of III—III of FIG. *2a* and looking in the direction of the arrows and showing one step of a two step sequence for transferring articles from the first conveyor to the second conveyor.
Figure 4:
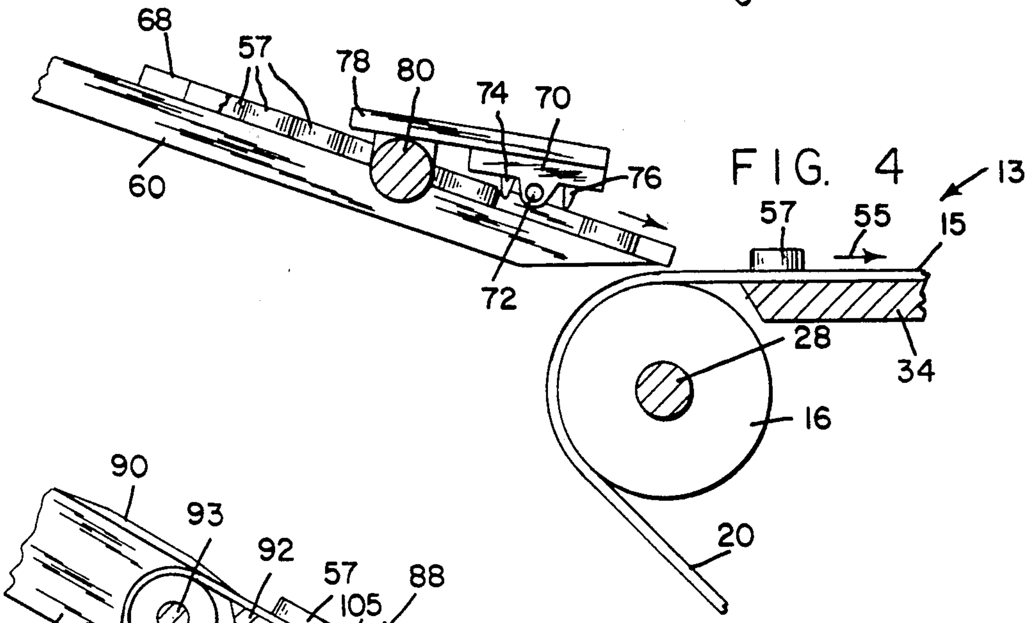
FIG. 4 is a view similar to FIG. 3 and showing the second step of the two step transfer sequence.

The articles to be coated, shown by way of example as disk 57, are deposited on the conveyor 12 by positive feed means which is generally indicated by the reference numeral 58. The positive feed means 58 comprises a slide chute 60 which is supported on framework which is generally indicated by the reference numeral 62 at the rear end of the conveyor 12. The slide chute 60 includes an upper inclined slide surface 64 which has a relatively slight incline angle and a lower slide surface 66 which has a relatively steep incline angle. A plurality of spaced elongated guide rails 68 are fixed to the lower portion of the lower slide surface 66. A metering bar 70 extends across the top of the guide rails 68. The ends of the metering bar 70 are pivotally mounted between the framework 17 by pivot pins 72 which enable the bar 70 to oscillate about a horizontal axis above the guide rails 68. The metering bar 70 includes a row of rear pins 74 and a row of forward pins 76. The pins 74 and 76 extend below the bar 70 between the guide rails 68, see also FIGS. 3 and 4. A rearwardly extending lever 78 is fixed to the top of the bar 70 and a laterally extending follower 80 is fixed to the bottom of the lever 78. The follower 80 is engaged by a cam 82 which is mounted for rotation with a shaft 84 which is journaled on a plate 81 which forms part of the framework 17. The shaft 84 is driven from the shaft 28 by means of a chain and sprocket drive mechanism which is generally indicated by the reference numeral 86. Rotation of the cam 82 causes the follower 80 to be alternately raised and lowered and causes the metering bar 70 to oscillate about the pins 72 between the position which is shown in FIG. 3 and in the position which is shown in FIG. 4.

The articles 57 to be coated are deposited on the upper inclined slide surface 64 in a random manner. The chute 60 is vibrated by conventional vibrating means, not shown, so that the articles work their way down to the lower guard surface 66 to the guide rails 68. The upper or rearward ends of the guard rails 68 are pointed and divert the articles between the guide rails wherein the articles are aligned into a plurality of longitudinal forward to rear rows against the metering bar 70. The metering bar 70 allows one article to be released from each row of articles for each oscillation of the bar 70. Referring particularly to FIGS. 3 and 4, when the cam follower 80 is raised, the rearward pins 74 are lifted above the level of the articles. This allows the articles to pass beneath the pins 74 to the forward pins 76 which extend below the level of the articles. When the follower 80 is lowered, the rearward ends 74 are lowered to a point below the upper level of the articles to prevent the articles from passing beyond the rearward pins 74. At the same time, the forward pins 76 are raised to release the one article which was between the forward end rearward pins for each roll of articles as shown in FIG. 4. The positive feed means 58 ensure that the articles are deposited on the upper surface 19 of the horizontal section 15 of the foraminous conveyor 12 at spaced intervals in longitudinal rows as shown in FIG. *2a*. The articles 57 are then conveyed through the spray housing 38 where they are covered with plastic resin powder. The ionized powder or resin particles cover all exposed surfaces of each article including the exposed areas of the surface of the article which rest on the surface 19 of the conveyor. Some of the particles pass through the conveyor and are then attracted upwardly to the lower surface of the article through the spaces in the conveyor. The bottom surface of the article is covered except for those areas which are in direct contact with solid elements of the conveyor.

Figure 5:
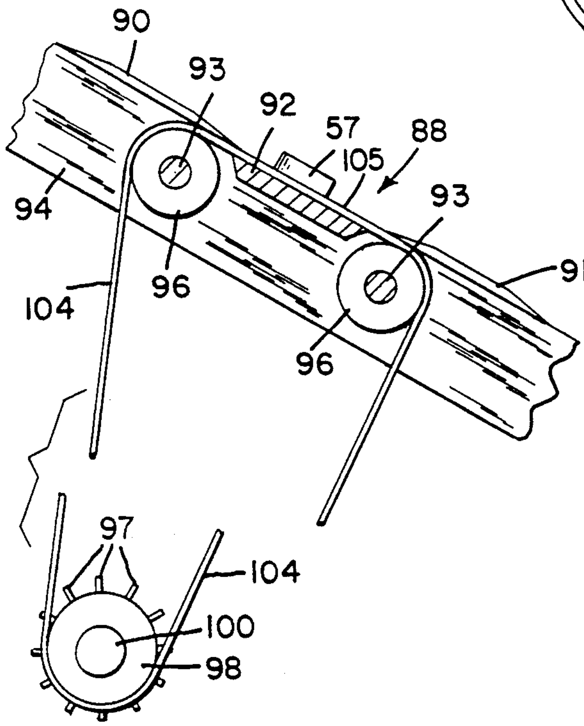
FIG. 5 is a fragmentary side elevational view on an enlarged scale of the apparatus for cleaning articles as they are transferred from a first conveyor to the second conveyor.

Referring particularly to FIGS. *1b* and *2b*, the articles 57 which pass from the spray housing 38 are coated with uncured plastic resin and are conveyed toward the conveyor 13. The articles are transferred from the conveyor 12 to the conveyor 13 by a bridging mechanism which is generally indicated by the reference numeral 88. The bridging mechanism 88 consists of a pair of spaced flat plates 90 and 91 and an intermediate plate 92 which is located between and below the plates 90 and 91. The plates 90, 91 and 92 extend transversely of the line of travel of the articles 57 and are supported at their ends by a pair of support brackets 94. The brackets 94 extend from the side plates 27 to the vertical posts 53. A pair of idler rolls 96 are rotatably mounted on a pair of parallel shafts 93 which are supported at their ends by the support brackets 94. A lower drive roll 98 is mounted for rotation with a shaft 100 which is journaled in a pair of support brackets 103. The drive roll 98 is rotated by a motor 102 through a chain and sprocket drive which is generally indicated by the reference numeral 101. An endless loop of wiping cloth 104 is trained around the drive roll 98 and the idler rolls 96 so that the cloth extends over the intermediate plate 92 and thereby presents an outer wiping surface 105 between the outer surfaces of the plates 90 and 91. A line of apertures 99 is located along each edge 95 of the cloth 104 for receiving drive pins 97 which extend from the surface of drive roll 98. The pins 97 extend through the apertures 99 when the cloth 104 extends around the roll 98, as shown in FIG. 5.

When an article reaches the end of the conveyor 12, it falls onto the plate 90 and slides across the plate 90, the wiping cloth 104 and across the plate 91 to the conveyor 13. As the article slides across the cloth surface 105, the bottom surface of the article is wiped clean of resin particles by the surface of the cloth. When the article reaches the conveyor 13, the bottom surface of the article is completely clean of resin particles. The article is thereafter further conveyed into the curing oven 56. Since all exposed surfaces of the article 57 are covered by uncured plastic resin, except for the bottom surface of the article, a permanent plastic coating is formed on all surfaces of the article except this bottom surface when the article emerges from the curing oven 56.

The cloth loop 104 is driven so that it travels upwardly along the plate 92 at a relatively slow speed so that the wiping surface 105 of the cloth is continuously changed. As the cloth loop 104 passes downwardly from the rearmost roller 96, resin particles or powder which have adherred to the outer surface of the cloth are removed by a flat air nozzle 106 which extends across the width of the cloth at the inner surface of the cloth. The nozzle 106 is connected to an air line 108 which is connected to a source of air at super-atmospheric pressure. A pressurized air stream is directed against the cloth 104 for dislodging resin particles from the outer surface of the cloth. These dislodged particles are then collected by a vacuum nozzle 110 at the end of a duct 111 which is operatively connected to the duct 46. The opening of the vacuum nozzle 110 is elongated and extends across the width of the cloth 104 opposite the air nozzle 106. An air nozzle 112 is located at the inner surface of the return portion 20 of the conveyor 12 and has an elongated horizontal opening which extends across the width of the conveyor. The air nozzle 112 is connected to an air line 113 which is connected to a source of air at super-atmospheric pressure. A jet of pressurized air is directed against the conveyor 20 from the air nozzle 112 to dislodge resin particles from the outer surface of the conveyor towards a vacuum nozzle 114. The vacuum nozzle 114 has an elongated horizontal opening which extends across the width of the conveyor 12 at the outer side of the conveyor and faces the air nozzle 112. The nozzle 114 is connected to the duct 111 so that particles which are collected from the conveyor 12 and the cloth 104 are drawn into the duct 46 to be joined with the particles which are collected from the conveyor at the bottom of the spray housing 38 for recycling. By cleaning the cloth 104 and advancing the cloth against the flow of articles at the bridging mechanism 88, the article passes across a clean portion of the cloth prior to reaching the forward plate 91. This insures that all remnants of resin particles are removed from the bottom surface of the article by the time the article reaches the conveyor 13. This also insures that there is no contamination of particles on the conveyor 13 as it enters the curing oven 56 so that the only resin particles which are cured in the oven 56 are those which are deposited on the articles themselves. The conveyor 12 is also maintained free of resin particles prior to its passing through the spray housing 38.

Referring particularly to FIGS. 7–11, there is shown an article which is an example of one type of article that is well suited for coating by the apparatus of the present invention. The article which is illustrated in FIGS. 7–11 is a ring which is generally indicated by the reference numeral 116 and which includes an upper surface 118 and a bottom surface 120. The ring 116 is coated by depositing the ring on the chute 60 so that the bottom surface 120 rests on the surface 64 of the chute. The ring 116 is thereafter deposited on the surface 19 of the conveyor 12 by the feed means 58 so that the bottom surface 120 rests on the upper surface 19 of the conveyor 12. The article 116 then passes through the spray housing 38 wherein all exposed surfaces of the article are coated with uncured resin powder, including areas of the bottom surface 120 which are located over openings in the conveyor. The resin particles on the lower surface 120 of the article 116 are removed by the cloth surface 105 as the article slides across the bridging mechanism 88 and is deposited on the conveyor 13. The article 116 thereafter passes through the curing oven 56 which cures the resin particles and forms a plastic coating 120 on all exposed surfaces of the article 116 except on the bottom surface 120 as shown in FIG. 10. The article 116 is then repositioned on the chute 60 so that the upper surface 118 rests on the surface 64 of the chute. When the article 116 is deposited on the conveyor 12 by the positive feed means 58, the upward surface 116 of the article rests on the upper surface 19 of the conveyor. As the article 116 passes through the spray housing 38, a complete coating of uncured resin powder is applied to the bottom surface 120 which now faces upwardly. Since the bottom coated surface 120 rests on the top surface of the conveyor 12, the article is insulated from the grounded conveyor so that it is primarily the upwardly facing bottom surface 120 which is covered with uncured resin powder. Any powder particles which happen to get on the top surface 118 of the article are removed as the article slides across the cloth surface 105 when the article transfers from the conveyor 12 to the conveyor 13. After the article 116 has made its second pass through the curing oven 56, the powder coating on the lower, now upwardly facing, surface 120 is cured and the article emerges from the curing oven 56 as a completely coated article as shown in FIG. 11.

Referring to FIG. 6, there is shown a modified metering bar which is generally indicated by the reference numeral 122. The bar 122 is similar to the metering bar 70 except that it is divided into two parts, a main part 124 and an adjustable part 126. The main part 124 is fixed to the pivot pins 72 and the lever 78 and contains the forward pins 76. The adjustable part 126 is adjustably mounted to the main part 124 for movement toward and away from the part 124 and contains the rearward pins 74 The adjustable part 126 is mounted to the main part 124 by means of a pair of adjusting screws 128 which extend freely through the adjustable part 126 and are threaded into the main part 124. Rotation of the screws 126 in one direction causes the adjustable part 126 to move toward the main part 124. Rotation of the screws 128 in the opposite direction causes the adjustable part 126 to move away from the main part 124. This enables the spacing between the pins 74 and 76 to be changed to accommodate articles of different sizes. The spacing between the rows of pins 74 and 76 is substantially equal to the diameter of the article so as to allow a single article from each row of articles to fit between the forward and rearward pins of the row. This insures that only one article is dispensed at a time for coating and the articles from each row are spaced as they enter the spray booth or housing 38.

Figure 12:
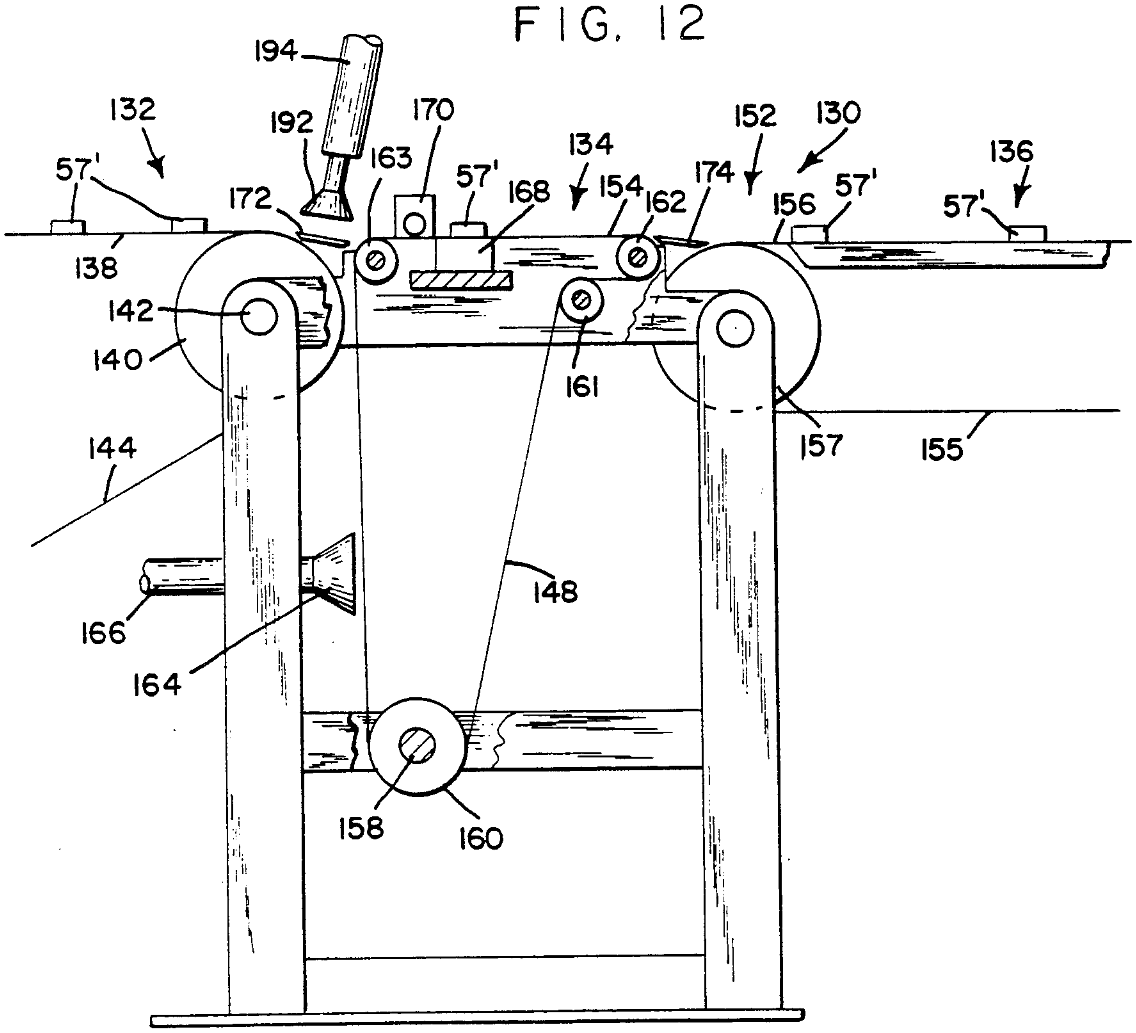
FIG. 12 is a diagrammatic side elevation view of a modified bridging mechanism.

Referring to FIG. 12 there is shown a modified bridging mechanism which is generally indicated by the reference numeral 130 which replaces the bridging mechanism 88 of the first embodiment. The bridging mechanism 130 is used for coating articles 57′ which are made of a paramagnetic material such as iron or other alloys which are attracted by a magnet. The bridging mechanism 130 comprises a second conveyor which is generally indicated by the reference numeral 134. The second conveyor 134 is located between a first conveyor which is generally indicated by the reference numeral 132 and a third conveyor which is generally indicated by the reference numeral 136.

The first conveyor 132 is an foraminous conveyor which is identical to the conveyor 12 in the first embodiment for transporting the articles 57′ from a first point through the spray housing 38 to a second point which is generally indicated by the reference numeral 146. The conveyor 132 is trained about a driving roll 140 which is mounted on a shaft 142 and rotated in the same manner as roll 18. The horizontally extending top run of the conveyor 132 is indicated by the reference numeral 138 and the lower run of the conveyor is indicated by the reference numeral 144.

Figure 1B:
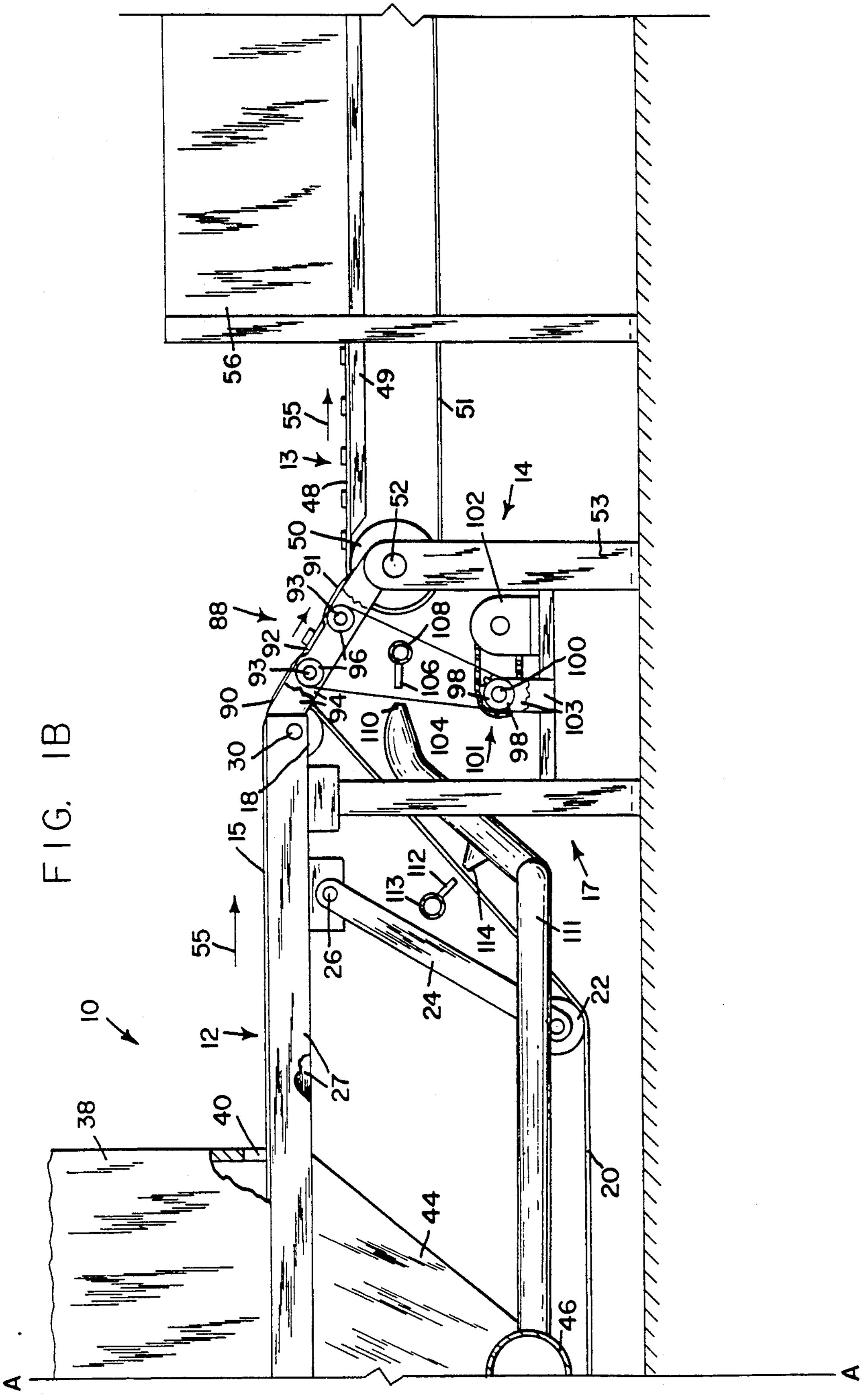
Figures 2A, 2B:
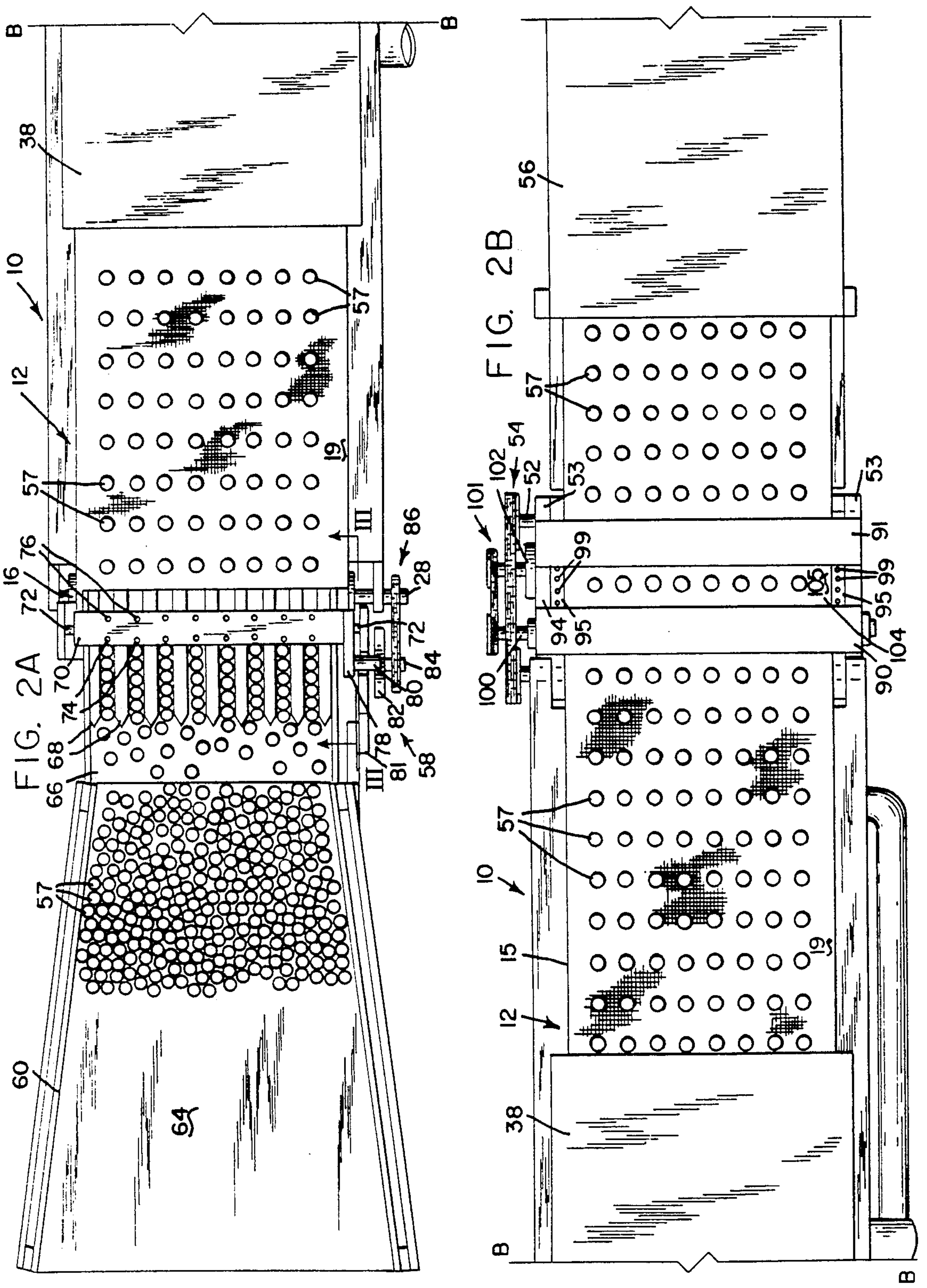

The second conveyor 134 comprises an endless loop of a wiping cloth 148 which is trained around a driving roll 160 which is mounted for rotation with a shaft 158. The shaft 158 is rotatably driven by an electric motor, not shown, in the same manner as shaft 100 of the first embodiment as shown in FIG. 1*b*. The wiping cloth 148 is trained around idler pulleys 161, 162, and 163 so that it extends horizontally between the idler pulleys 163 and 162 to define an upper run 154. The outer surface of the cloth 148 has a relatively soft and relatively coarse texture.

The third conveyor 136 is identical to the conveyor 13 of the first embodiment and includes an endless belt which is trained around a roll 157 and defines a lower horizontal run 155 and an upper horizontal run 156. The upper run 156 conveys the articles 57′ from the third point 152 through the curing oven 56 to a fourth point, not shown. A first transfer plate 172 is located at the second point 146 which is between the end of the conveyor 132 and the conveyor 134. A second transfer plate 174 is located at the third point which is between the conveyor 134 and the conveyor 136. The upper run 154 of the second conveyor 134 is slightly lower than the upper run 138 of the first conveyor 132. The upper run 156 of the third conveyor 136 is slightly lower than the upper run 154 of second conveyor 134. The first transfer plate 172 slopes downwardly from the end of the run 138 to the beginning of the run 154. The transfer plate 174 slopes downwardly from the end of the run 154 to the beginning of the run 156. The articles 57′ are conveyed along the run 138 to the plate 172 and thereafter slide down the plate 172 to the run 154. The articles 57′ are conveyed along the run 154 to the plate 174, whereupon they slide down the plate 174 to the run 156. An electromagnet 168 is located below the run 154 and extends horizontally and transversely of the run 154 across the entire width of the run 154. A photo-electric detector 170 is located between the second point 146 and the electromagnet 168. The photo-electric detector 170 includes a transmitter at one side edge of the run 154 and a receiver at the opposite side edge. A light beam is transmitted from the transmitter to the receiver across the top of the run 154 at the level of the articles 57′ so that as an article 57′ passes between the transmitter and the receiver, the light beam is interrupted. The interruption of the light beam causes the receiver to generate an electrical signal for energizing the electromagnet 168.

Figure 13:
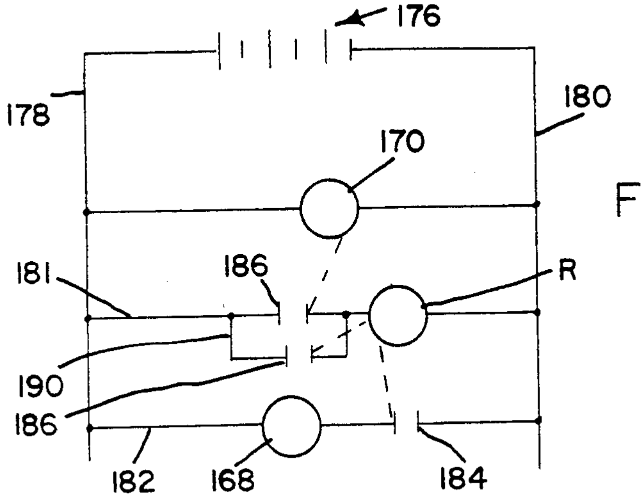
FIG. 13 is an electrical schematic for the modification of FIG. 12.

Referring to the electrical-schematic of FIG. 13 the photoelectric detector 170 is connected across a pair of power lines 178 and 180 which are connected to a source of electrical power 176. The electromagnet 168 is located on the line 182 which also contains a normally open contact 184 so that the electromagnet 168 is normally de-energized. A time delay relay R is located on the line 181 which also contains a normally opened contact 186 so that the relay R is normally de-energized. When the beam from the photo-electric detector 170 is interrupted by an article 57', the detector 170 is effective to close the contact 186 which momentarily energizes the relay R. When the relay R is energized, it is effective to close the normally open contact 184 on line 182 thereby energizing the electromagnet 168. Energization of relay R also is effective to close a normally open contact 188 on a line 190 which bridges the contact 186 to maintain the relay R energized. The time delay relay R maintains the contacts 188 and 184 closed for a predetermined time period, after which contacts 184 and 186 open and the relay R and the electromagnet become deenergized. Since the articles 57' are made of a paramagnetic material they are attracted to the magnet 168 when the magnet is energized. The articles are retained against the magnet in a stationary position while the cloth 148 continues to pass between the magnet 168 and the article 57'. This relative motion between the article 57' and the cloth 148 causes the lower surface of the article 57' which rests on the top run 154 to be wiped by the outer surface of the cloth to remove all uncured coating particles from the bottom surface of the article. When the electromagnet 168 is de-energized, the article 57' is conveyed by the cloth to the third point 152 where it is transferred to the third conveyor 136 and then to the curing oven 56. After the powder coating which remains on the outer surfaces of the article 57' has been cured, the article is then repositioned on the run 138 of the conveyor 132 in an inverse position so that the surface which was previously wiped of uncured coating particles faces upwardly and is now covered with uncured resin powder. The article 57' is eventually conveyed by the conveyors 134 and 136 back to the curing oven so that the powder coating on the lower, now upwardly facing, surface 120 is cured and the article emerges from the curing oven 56 as a completely coated article as shown in FIG. 11. A vacuum nozzle 164 is located adjacent the outer surface of the section of the cloth 148 which extends from the outer roll 163 to the roll 160 and is connected to a source of sub-atmospheric pressure, not shown, by a duct 166. As the cloth 148 passes downwardly from the outer roller 163 to the roll 160 it passes by the nozzle 164. The uncured resin powder which has been wiped on the surface of the cloth 148 is vacuumed from the cloth by the vacuum nozzle 164. If desired, the same cleaning mechanism which is shown in FIG. 1*b* can also be utilized for cleaning the cloth 148. A vacuum nozzle 192 is located just above the first transfer plate 172. The nozzle 192 is connected to a source of sub-atmospheric pressure by a duct 194 and is effective for collecting loose powder which is dislodged from the bottom surface of the articles 57' as they slide along the plate 172.

The articles 57' are deposited on the conveyor 132 in a more or less random manner and remain in this state as they approach the magnet 168. When at least one article is detected by the detector 170, the electromagnet 168 is energized and the article is held by the magnet when it reaches a position on the top run 154 of the conveyor 134 just above the magnet. During a typical operation, a plurality of articles 57' extend across the width of the conveyor 134 with no particular pattern of alignment. However, when the magnet 168 is energized, the articles 57' which arrive at the magnet when it is energized become aligned along a transverse or side to side row and each article is spaced from adjacent articles. When the magnet 168 is subsequently de-energized, all of the articles 57' in the side to side row which has just been formed are advanced as a row along run 154 toward the conveyor 136. When the next group of articles 57' is detected and stopped by the magnet 168, another row of articles is formed and subsequently released so that the articles 57' approach the conveyor 136 in spaced crosswise rows like an army of marching soldiers. This phenomena insures that the articles do not bump into one another and at the same time maximizes the use of conveyor space and greatly increases production.

A still further modification of the invention involves the substitution of the electromagnet 168 by a permanent magnet which is mounted for movement toward and away from the upper run 154. This can be accomplished in several ways for example, the permanent magnet can be mounted on the end of a piston which is actuated by a solenoid controlled hydraulic and pneumatic cylinder. The cylinder is controlled by the relay R so that the permanent magnet is in a lower or inactive position when the solenoid which activates the cylinder is de-energized and moved upwardly to an active position just beneath the run 154 when the solenoid is energized by the relay R. The magnet remains in the upper or active position for a predetermined time period and then returns to the lower inactive position.

Clearly minor changes may be made in the form and construction of this invention and in the embodiments of the process without departing from the material spirit of either. Therefore, it is not desired to confine the invention to the exact forms shown herein and described, but it is desired to include all subject matter that properly comes within the scope claimed.

The invention having been thus described, what is claimed as new and desired to secure by letters patent is:

1. An apparatus for coating an article said article having at least one flat surface, said apparatus comprising:

(a) a foraminous first conveyor having an upper horizontal surface for supporting said article so that said flat surface rests on said upper horizontal surface and for conveying said article from a first point to a second point, (b) an applicator between said first and second points for depositing uncured coating particles on all exposed surface areas of said article while said article is on said first conveyor, (c) a second conveyor for conveying said article between said second point and a third point, (d) means for transferring said article from said first conveyor to said second conveyor so that the flat surface of said article rests on said second conveyor, (e) means for removing uncured coating particles from the flat surface of said article prior to the transfer of said articles to said second conveyor, and (f) curing means between said second point and said third point for curing the uncured particles on said article while said article is on said second conveyor.

2. An apparatus as recited in claim 1, further comprising conveyor cleaning means for removing uncured coating particles from said foraminous conveyor after said article is transferred to said second conveyor.

3. An apparatus as recited in claim 2, wherein said article and said foraminous conveyor are metallic and said coating particles are plastic.

4. An apparatus as recited in claim 1, wherein said article and said foraminous conveyor are metallic and said coating particles are plastic.

5. An apparatus for coating an article, said article having an upper flat surface and an opposite lower flat surface, said apparatus comprising:

(a) a foraminous first conveyor having an upper horizontal surface for supporting said article so that either of said upper and lower flat surfaces rests on the upper horizontal surface of said conveyor and for conveying said article from a first point to a second point, (b) an applicator between said first and second points for depositing uncured coating particles on exposed surface areas of said article while said article is on said first conveyor, (c) a second conveyor for conveying said article from said second point to a third point, (d) means for transferring said article from said first conveyor to said second conveyor so that the flat surface of said article which rested on said first conveyor rests on said second conveyor, (e) means for removing uncured coating particles from the flat surfacer of said article which rests on said first conveyor prior to the transfer of said article to said second conveyor, and (f) curing means between said second and third points for curing the uncured particles on said article while said article is on said second conveyor.

6. An apparatus as recited in claim 5, wherein said article and said foraminous conveyor are metallic and said coating particles are plastic.

7. An apparatus for coating an article said article having an upper flat surface and an opposite lower flat surface, said apparatus comprising:

(a) a foraminous first conveyor having an upper horizontal surface for supporting said article so that either of said upper and lower flat surfaces rests on the upper horizontal surface of said first conveyor and for conveying said article from a first point to a second point, (b) an applicator between said first and second points for depositing uncured coating particles on exposed surface areas of said article while said article is on said first conveyor, (c) a second conveyor having an upper surface for conveying said article from said second point to a third point so that the flat surface of said article which rested on said first conveyor rests on said second conveyor, the upper surface of said second conveyor having a wiping texture, (d) means for retaining said article in a stationary position for a predetermined period of time while said article is on said second conveyor so that there is relative movement between the upper surface of said second conveyor and said article so that uncured coating particles are removed from the flat surface of said article which rests on said second conveyor as a result of said relative movement, (e) a third conveyor for conveying said article from said third point to a fourth point, and (f) curing means between said third and fourth points for curing the uncured particles on said article while said article is on said third conveyor.

8. An apparatus for coating an article as recited in claim 7, wherein said article is made of a paramagnetic material and wherein said means for retaining said article comprises:

(a) an electromagnet which is located immediately beneath said second conveyor, (b) sensing means for detecting the presence of said article on said second conveyor at a point between said second point and said electromagnet and for generating an electrical signal when said article is detected, (c) electrical control means operatively connected to said electromagnet and said sensing means for receiving said electrical signal from said sensing means and for energizing said electromagnet for a predetermined time period upon receiving said electrical signal.

9. An apparatus for coating an article as recited in claim 8, wherein said sensing means is a photo-electric detector and said control means comprises a time delay relay which is normally de-energized and which is energized for a predetermined time period upon receipt of said electrical signal.

10. An apparatus for coating an article as recited in claim 7, wherein said first conveyor is higher than said second conveyor and said second conveyor is higher than said third conveyor, and wherein said apparatus further comprises:

(a) a first transfer plate at said second point said first transfer plate being inclined downwardly from said first conveyor to said second conveyor so that as said article reaches said second point it slides down said first transfer plate to said second conveyor, and (b) a second transfer plate at said third point, said second transfer plate being inclined downwardly from said second conveyor to said third conveyor so that as said article reaches said third point it slides down said second transfer plate to said third conveyor.

11. An apparatus for coating an article, said article having at least one flat surface said apparatus comprising:

(a) a foraminous first conveyor having an upper horizontal surface for supporting said article so that said flat surface rests on the upper horizontal surface of said first conveyor and for conveying said article from a first point to a second point, (b) an applicator between said first and second points for depositing uncured coating particles on exposed surface areas of said article while said article is on said first conveyor, (c) a second conveyor having an upper surface for conveying said article from said second point to a third point so that the flat surface of said article rests on the upper surface of said second conveyor, the upper surface of said second conveyor having a wiping texture, (d) means for retaining said article in a stationary position for a predetermined period of time while said article is on said second conveyor so that there is relative movement between the upper surface of said second conveyor and said article so that uncured coating particles are removed from the flat surface of said article as a result of said relative movement, (e) a third conveyor for conveying said article from said third point to a fourth point, and (f) curing means between said third and fourth points for curing the uncured particles on said article while said article is on said third conveyor.

12. An apparatus for coating an article as recited in claim 11, wherein said article is made of a paramagnetic material and wherein said means for retaining said article comprises:

(a) an electromagnet which is located immediately beneath said second conveyor, (b) sensing means for detecting the presence of said article on said second conveyor at a point between said second point and said electromagnet and for generating an electrical signal when said article is detected, (c) electrical control means operatively connected to said electromagnet and said sensing means for receiving said electrical signal from said sensing means and for energizing said electromagnet for a predetermined time period upon receiving said electrical signal.

13. An apparatus for coating an article as recited in claim 12, wherein said sensing means is a photo-electric detector and said control means comprises a time delay relay which is normally de-energized and which is energized for a predetermined time period upon receipt of said electrical signal.

14. An apparatus for coating an article as recited in claim 12, wherein said first conveyor is higher than said second conveyor and said second conveyor is higher than said third conveyor, and wherein said apparatus further comprises:

(a) a first transfer plate at said second point said first transfer plate being inclined downwardly from said first conveyor to said second conveyor so that as said article reaches said second point it slides down said first transfer plate to said second conveyor, and (b) a second transfer plate at said third point, said second transfer plate being inclined downwardly from said second conveyor to said third conveyor so that as said article reaches said third point it slides down said second transfer plate to said third conveyor.

15. An apparatus for coating an article, said article having at least one flat surface, said apparatus comprising:

an endless foraminous first conveyor which travels in a loop and which has an upper conveying portion and a lower return portion, said conveyor having an outer surface and an inner surface, said conveyor travelling substantially horizontally along said upper conveying portion from a first point to a second point, said conveyor supporting the article so that the flat surface of the article rests on the outer surface of the upper conveying portion of said conveyor, said conveyor conveying said article from said first point to said second point, (b) an applicator for depositing uncured coating particles on all exposed surface areas of said article as the article moves from said first point to said second point, a second conveyor for conveying said article substantially horizontally from said second point to a third point, said second conveyor being at a lower level than said first conveyor, (d) a bridging element for transferring said article from said foraminous first conveyor to said second conveyor after the article has passed said second point, so that the flat surface of said article rests on said second conveyor, said bridging element being an inclined wiping surface which extends downwardly from said first conveyor to said second conveyor, so that said article slides on said wiping surface from said first conveyor to said second conveyor with the flat surface of said article in engagement with said wiping surface, said wiping surface having a texture which enables said wiping surface to wipe said coating particles from the flat surface of the article as said article slides downwardly along said wiping surface, and (e) curing means between said second point and said third point for curing the uncured particles on said article as the article is conveyed from said second point to said third point.

16. An apparatus as recited in claim 15, wherein said wiping surface is cloth.

17. AN apparatus as recited in claim 16, wherein said cloth is formed onto an endless loop, a portion of which extends along said inclined surface to form a cloth surface portion of said inclined surface, a portion of said endless loop being clear of said inclined surface, said apparatus further comprising:

(a) drive means for advancing said cloth along said loop so that the cloth surface portion of said inclined surface is progressively and continuously changed, and (b) cloth cleaning means for removing uncured coating particles from the portion of said cloth which is clear of said inclined surface.

18. An apparatus as recited in claim 17, wherein the portion of said cloth which forms said inclined surface move upwardly.

19. An apparatus as recited in claim 18, wherein said cloth cleaning means is an air jet which is located at a point inside of said cloth loop for blowing air through the cloth to dislodge uncured coating particles from said cloth.

20. An apparatus as recited in claim 19, wherein a vacuum nozzle is located at the outside of said cloth loop opposite said air jet for collecting said dislodged coating particles.

21. An apparatus for coating an article, said article having at least one flat surface, said apparatus comprising:

(a) an endless foraminous first conveyor which travels in a loop and which has an upper conveying portion and a lower return portion, said conveyor having an outer surface and an inner surface, said conveyor travelling substantially horizontally along said upper conveying portion from a first point to a second point, said first conveyor supporting the article so that the flat surface of the article rests on the outer surface of the upper conveying portion of said conveyor, said first conveyor conveying said article from said first point to said second point, (b) an applicator for depositing uncured coating particles on all exposed surface areas of said article as the article moves from said first point to said second point, (c) a second conveyor for conveying said article substantially horizontally form said second point to a third point, (d) a bridging element for transferring said article from said foraminous first conveyor to said second conveyor after the article has passed said second point, so that the flat surface of said article rests on said second conveyor, (e) curing means between said second point and said third point for curing the uncured particles on said article as the article is conveyed from said second point to said third point, and (f) conveyor cleaning means for removing uncured coating particles from the return portion of said foraminous first conveyor, said cleaning means comprising an air jet which is located at the inner surface of said foraminous first conveyor for blowing air through the foraminous first conveyor to dislodge uncured coating particles from the outer surface of said foraminous first conveyor.

22. An apparatus as recited in claim 21, wherein a vacuum nozzle is located at the outer surface of said foraminous first conveyor opposite said air jet for collecting said dislodged coating particles.

23. An apparatus for coating an article, said article having at least one flat surface, said apparatus comprising:

(A) an endless foraminous first conveyor which travels in a loop and which has an upper conveying portion and a lower return portion, said conveyor having an outer surface and an inner surface, said first conveyor travelling substantially horizontally along said upper conveying portion from a first point to a second point, said conveyor supporting the article so that the flat surface of the article rests on the outer surface of the upper conveying portion of said conveyor, said first conveyor conveying said article from said first point to said second point, (B) an applicator for depositing uncured coating particles on all exposed surface areas of said article as the article moves from said first point to said second point, (C) a second conveyor for conveying said article substantially horizontally from said second point to a third point, (D) a bridging element for transferring said article from said foraminous first conveyor to said second conveyor after the article has passed said second point, so that the flat surface of said article rests on said second conveyor, (E) curing means between said second point and said third point for curing the uncured particles on said article as the article is conveyed from said second point to said third point, and (F) positive feed means for depositing a plurality of articles to be coated on said foraminous conveyor in a predetermined spaced relationship, said positive feed means comprising:

(1) a slide chute which has a flat slide surface that extends from a higher end which is substantially above said foraminous first conveyor down to a lower end to said foraminous first conveyor at said first point, (2) a plurality of spaced longitudinal guides at the lower end of said slide chute for dividing articles which are placed on said chute into a plurality of spaced descending rows, and (3) a metering apparatus at the lower end of said spaced guides for preventing said articles from sliding freely from said chute to said foraminous first conveyor and for metering one article at a time from each of said rows of articles to said foraminous first conveyor at predetermined timed intervals, said metering apparatus comprising:

(a) a bar which extends transversely of said guides and which is pivoted for rocking about a horizontal axis which is transverse to said guides, (b) a plurality of upstream pins which extend downwardly from said bar on the chute side of said axis for selectively blocking the descent of said articles along said slide surface, (c) a plurality of downstream pins on the foraminous first conveyor side of said axis for selectively blocking the descent of said articles along said slide surface, and (d) drive means for rocking said bar about said axis alternatively in a first direction and a second direction so that said upstream pins are moved out of article obstructing position while said downstream pins are moved into article obstructing position upon rocking of said bar in said first direction, and said upstream pins are moved into article obstructing position while said downstream pins move out of article obstructing position upon rocking of said bar in said second direction.

* * * * *